United States Patent

Biggane

[15] 3,650,499

[45] Mar. 21, 1972

[54] CLAMP FOR PIPE SUPPORT WITH SLANTING PIVOTAL ASSEMBLY

[72] Inventor: John D. Biggane, Mill Valley, Calif.
[73] Assignee: Superior Strut & Hanger Company
[22] Filed: Jan. 11, 1971
[21] Appl. No.: 105,454

[52] U.S. Cl. ............................................248/62, 248/74 R
[51] Int. Cl. .........................................................F16l 3/24
[58] Field of Search .............................248/62, 72, 74 R, 73

[56] References Cited

UNITED STATES PATENTS

| | | | |
|---|---|---|---|
| 1,546,839 | 7/1925 | Klingel | 248/62 X |
| 3,522,921 | 8/1970 | Lytle | 248/62 |
| 3,527,432 | 9/1970 | Lytle | 248/62 |

*Primary Examiner*—Chancellor E. Harris
*Attorney*—George B. White

[57] ABSTRACT

A pair of complementary clamping plates, each plate being curved or dished to form a nesting seat for the pipe and has a pivot and clamping flange on one end of the curved portion, and has a straight flat portion extending tangentially from the other end of the curved portion; one edge of each of the flat portions is perpendicular and has a notch to form a shoulder to hang over one of the inturned flanges in a supporting channel, the other edge of said tangential portion having a shoulder to engage the other inturned flange in the supporting channel and has the edge from its shoulder to the seat converging or slanting toward the opposite edge; the adjacent edge of the nesting seat is cut away in continuation of the slanting edge to form an arcuate edge; the notched perpendicular edge of one of the plates being opposite the slanting edge of the other plate whereby the pivoting of the plates about a loose securing bolt in the clamping flanges and tilting transversely at a slanting angle permits insertion of the plates through the space between the inturned flanges of the supporting channel so that by straightening the plates into nesting attitude the respective shoulders are turned over the respective inturned flanges for suspending a pipe in the seats of the opposite plates.

3 Claims, 9 Drawing Figures

Patented March 21, 1972
3,650,499
2 Sheets-Sheet 1
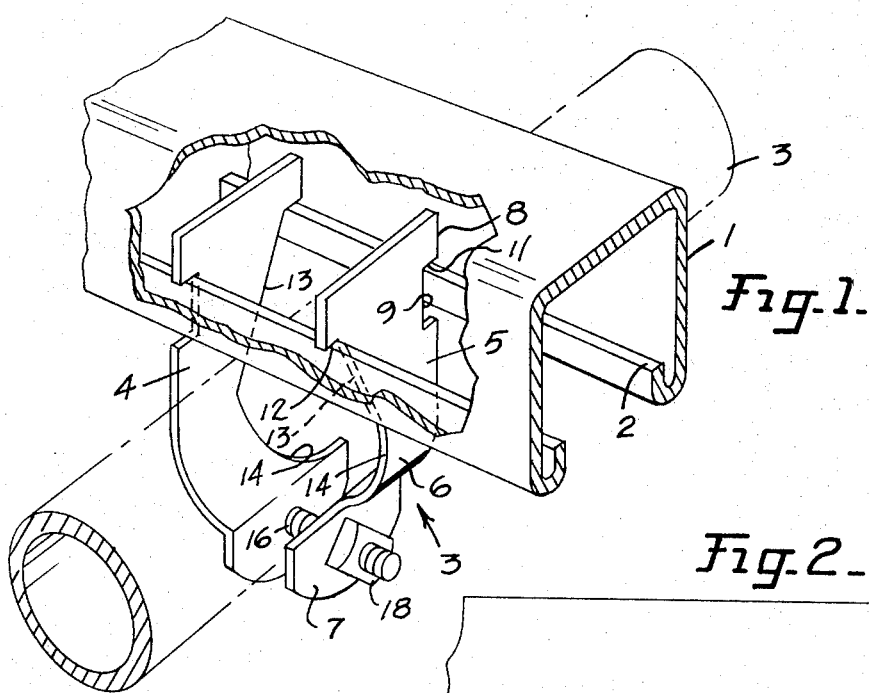
Fig.1.
Fig.2.
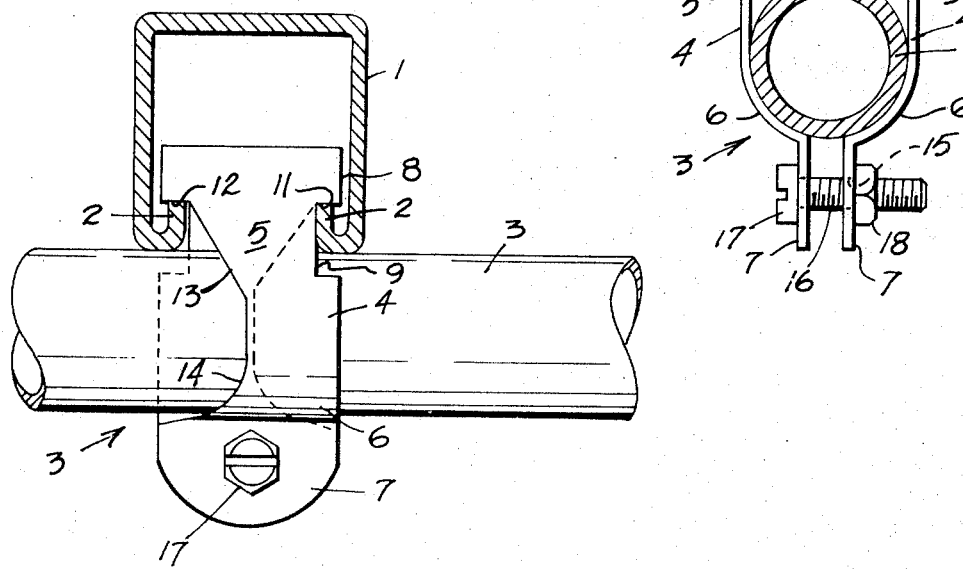
Fig.3.
INVENTOR.
JOHN D. BIGGANE
BY
George N. White
ATTORNEY Patented March 21, 1972
3,650,499
2 Sheets-Sheet 2
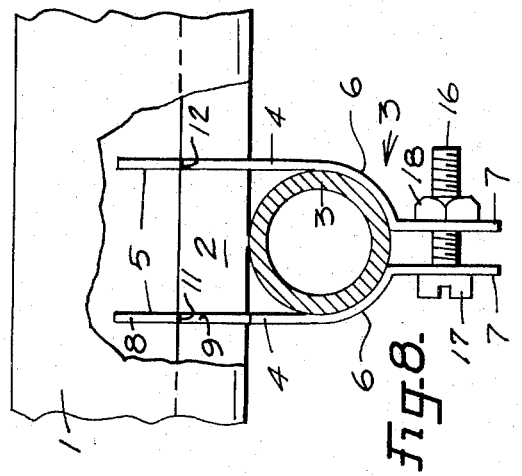
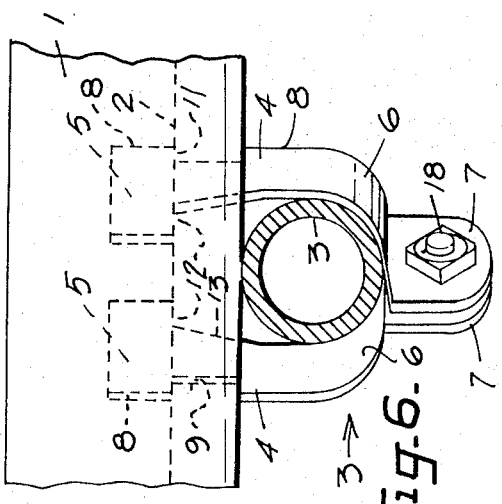
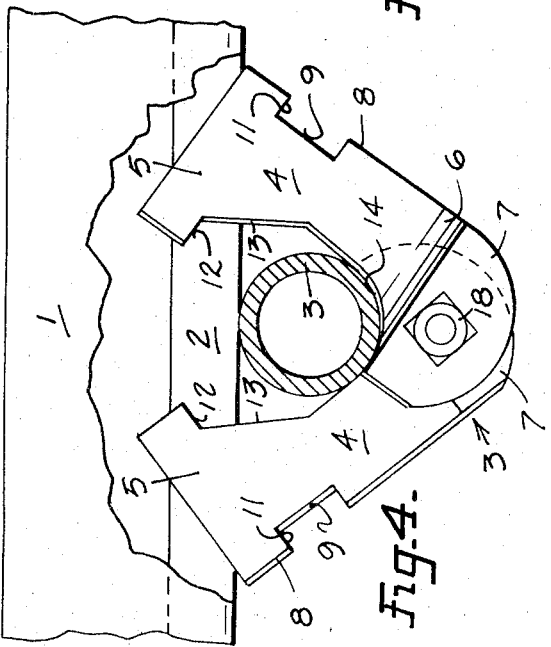
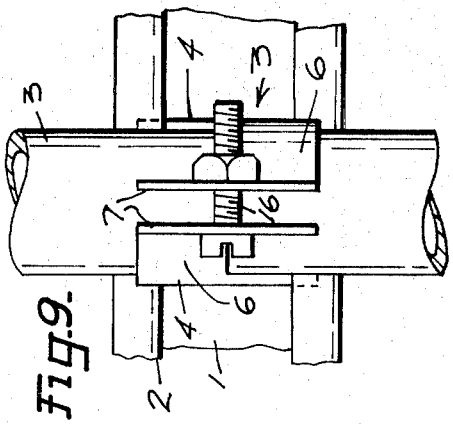
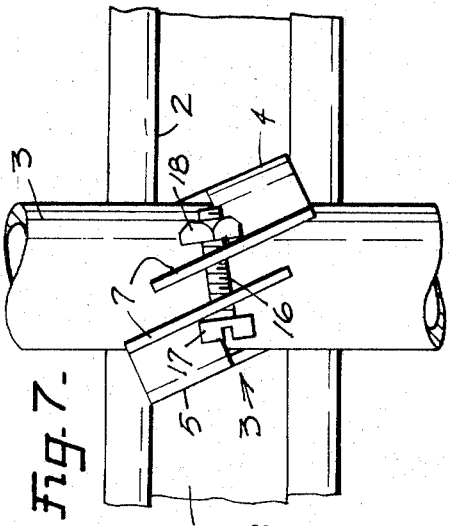
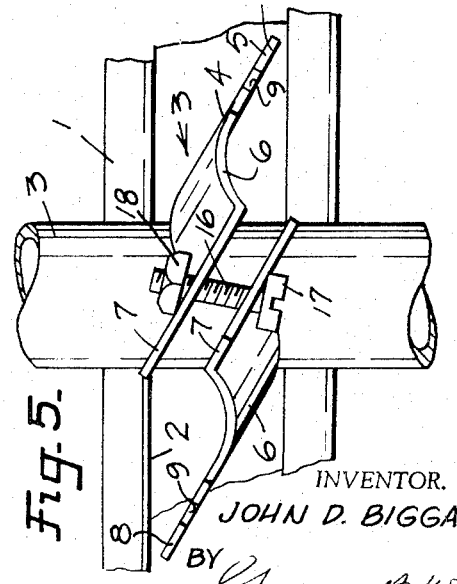
INVENTOR.
JOHN D. BIGGANE
BY
ATTORNEY

CLAMP FOR PIPE SUPPORT WITH SLANTING PIVOTAL ASSEMBLY

BACKGROUND OF THE INVENTION

The pipe support with slanting pivotal assembly herein is an improvement on the type of supports shown in the copending application, of Walter W. Lytle, Ser. No. 734,038, filed on June 3, 1968 and allowed on Apr. 28, 1970, now U.S. Pat. No. 3,527,432; and in U.S. Pat. No. 3,522,921 issued to Superior Strut & Hanger Co., Inc., Assignee, on Aug. 4, 1970 on a Clamp for Pipe Support.

The improvement in this case is the provision of slanting one of the edges from one of the hanging shoulders toward the curved seat of the plate and also providing a cut away arcuate edge on the seat in continuation of the slanting edge, so that when the clamping bolt is loose in the clamping flanges under the seat the plates can be shifted laterally away from one another correspondingly slanting the position of the pivot, whereby the assembled unit is so arranged that the shouldered flat ends of the respective plates are somewhat longitudinal relatively to the space between the parallel supporting flanges of the supporting channel or bracket, and can be inserted simultaneously in assembled relation and then turned into engagement with the respective inturned flanges by straightening the plates, whereby the seat portions are nested on the pipe. This feature provides for a simple operation which can be performed by the worker singlehanded and eliminates the necessity for separate insertion of opposite plates and manipulation for the engagement with the suspending flanges.

BRIEF DESCRIPTION OF THE DRAWINGS

FIG. 1 is a perspective view, partly in section, with the supporting channel being partly broken away with the hanger in supporting position.

FIG. 2 is a cross-sectional view of the pipe being supported and an end view of the clamp or hanger in position.

FIG. 3 is a side view of the hanger in position with the channel in section.

FIG. 4 is a cross-sectional view of the pipe with the clamp or hanger plates being offset to a position for insertion between the supporting flanges.

FIG. 5 is a bottom view showing the slanting pivot and offset of the clamping plates.

FIG. 6 shows the pipe in section and the clamping plates inserted between the inturned flanges and partly turned.

FIG. 7 is a bottom view of the pivot and the clamping plates in the position shown in FIG. 6 showing the partly straightened plates.

FIG. 8 shows the pipe in cross section and the clamping plates in engaged clamping or hanging position.

FIG. 9 is a bottom view of the pipe showing the clamping plates in engaged hanging attitude.

DETAILED DESCRIPTION

The hanger is applied to an inverted channel 1, the lower free edges of which are turned inwardly to form retaining or hanging flanges 2. A pipe or tube 3 is hung on the flanges by the clamping and supporting device 3.

The clamping device or hanger 3 includes a pair of plates 4, the upper flat portions 5 of which are parallel. Each flat portion 5 of each plate 4 is tangential to a curved nesting portion 6. Each nesting portion 6 is cross-sectionally about one quarter of a circle of about $90_o$. From the horizontal end of each curved nesting portion 6 extends a clamping flange 7 generally parallel with the flat portion 5 and being in a plane offset inwardly from the flat portion 5 toward the opposite clamping flange.

Each flat portion 5 of each plate 4 has a substantially perpendicular edge 8 provided with a notch 9 to form a hanging shoulder 11 adapted to rest on one of the inturned flanges 2. The opposite edge of each plate also has a shoulder 12 in transverse registry with the shoulder 11 to rest on the other inturned flange 2. The perpendicular edge 13 between the shoulder 12 and the curved portion 6 is cut away so as to be inclined or slanted from the shoulder 12 toward the middle of the flat plate 4. The adjacent edge 14 of the curved nest portion 6 is also cutaway in continuation of the edge 13 to the clamping flange 7 and forms a curved cutaway edge. The cutaway inclined edges 13 and 14 of the plate 4 are opposite to the perpendicular edge 8 of the opposite plate 4 and vice versa. Each flange 7 has a pivot hole 15, and a clamping bolt 16 is extended through the holes 15. The holes 15 are larger than the bolt 16. The head 17 of the bolt 16 engages the outside of one flange 7 and a nut 18 on the bolt 16 engages the outside of the other flange 7 to clamp the plates together in the hanging position shown in FIGS. 1, 2 and 3.

By reason of the cutaway portions 13 and 14 and looseness of the bolt 16 in the holes 15, the opposite plates 4 can be turned on the bolt 16 and tilted transversely as shown in FIG. 4. In this position the curved nesting portions 6 are partly edgewise relatively to the lower portion of the pipe 3. The cut away portions permit the twisting of the opposite plates into parallel transversely inclined planes into the tilted positions shown in FIGS. 4 and 5. In this position the plates, while on the pipe, can be easily inserted together through the space between the hanging flanges 2. After such insertion as shown in FIGS. 6 and 7, the plates are turned from the transversely tilted position of FIGS. 6 and 7 into perpendicular parallel position at right angles to the channel 1 as shown in FIGS. 8 and 9, and then by tightening the nut on the bolt the plates are clamped in position on the pipe.

In this manner the assembled unit can be easily applied over a pipe, and fumbling with individual plates and insertion of the bolt and individual adjustments is obviated.

I claim:

1. A clamp for pipe support on spaced inturned flanges of a structural element comprising,
   a pair of plates,
   an arcuate nesting portion of each plate for engagement with the lower portion of a pipe,
   a flat portion extending tangentially from the upper end of the arcuate nesting portion,
   a clamping flange extended from the inner end of the arcuate portion in a plane generally parallel with said tangential flat portion,
   a perpendicular edge on each flat portion having a recess to form a first hanging shoulder engageable with one of said inturned flanges,
   a second hanging shoulder on the other edge of each plate transversely aligned with said first shoulder and engageable with the other inturned flange,
   the edge extended from said second hanging shoulder being inclined inwardly toward said perpendicular edge and to said arcuate nesting portion,
   the edge of said arcuate nesting portion in continuation of said inclined edge being cutaway to form an arcuate nesting edge,
   fastening means to clamp said clamping flanges together,
   the inclined edge of one of said plates being opposite the perpendicular edge of the opposite plate whereby said plates can be turned into a transversely tilted position with the inclined and arcuate cutaway edges toward the pipe, for insertion through the space between said inturned flanges and then for turning back into nesting engagement with the pipe with said shoulders over the respective inturned flanges,
   and initially loose clamping means assembled with said clamping flanges and being adapted to tightly clamp said flanges together in the hanging position of said plates.

2. The invention defined in claim 1, and
   said clamping means including a clamping bolt extended loosely through aligned holes in said clamping flanges.

3. The invention defined in claim 1, and
   the said arcuate nesting portion being cross-sectionally about one quarter circle of about 90° whereby said clamping flanges are offset relatively to the respective shoulders inwardly toward one another.